(12) United States Patent
Simon (10) Patent No.: US 9,853,436 B2
(45) Date of Patent: Dec. 26, 2017

(54) CABLE ORGANIZER AND PROTECTOR

(71) Applicant: Richard B. Simon, Red Bank, TN (US)

(72) Inventor: Richard B. Simon, Red Bank, TN (US)

( * ) Notice: Subject to any disclaimer, the term of this patent is extended or adjusted under 35 U.S.C. 154(b) by 0 days.

(21) Appl. No.: 15/395,430

(22) Filed: Dec. 30, 2016

(65) Prior Publication Data
US 2017/0194780 A1    Jul. 6, 2017

Related U.S. Application Data

(63) Continuation-in-part of application No. 29/589,295, filed on Dec. 29, 2016.

(60) Provisional application No. 62/272,767, filed on Dec. 30, 2015.

(51) Int. Cl.
*H02G 7/00* (2006.01)
*H02G 7/12* (2006.01)

(52) U.S. Cl.
CPC ..................... *H02G 7/12* (2013.01)

(58) Field of Classification Search
CPC ............ B60R 16/0207; B60R 16/0215; H01B 7/0045; H01B 11/00; H01B 12/00; H01B 5/00; H01B 7/00; H01B 9/00; H01R 4/00; H02G 15/08; H02G 3/04; H02G 7/12; G02B 6/02; G02B 6/44
See application file for complete search history.

(56) References Cited

U.S. PATENT DOCUMENTS

| | | | | |
|---|---|---|---|---|
| D354,904 S | * | 1/1995 | Halsten | D8/356 |
| 6,012,940 A | * | 1/2000 | Wheeler | H01R 13/6392 |
| | | | | 439/369 |
| D587,102 S | * | 2/2009 | Morgan | D8/356 |
| D644,501 S | * | 9/2011 | Chen | D8/356 |
| D691,875 S | * | 10/2013 | Ganski | D8/356 |
| 2001/0035295 A1 | * | 11/2001 | Cipollone | H02G 3/26 |
| | | | | 174/72 A |
| 2009/0065249 A1 | * | 3/2009 | Silvers | H02G 3/30 |
| | | | | 174/72 A |
| 2011/0147542 A1 | * | 6/2011 | Hoek | F16L 3/223 |
| | | | | 248/68.1 |

\* cited by examiner

*Primary Examiner* — Pete Lee (57) ABSTRACT

A cable organizer and protector specifically designed for electrocardiogram (EKG) machines, or any device or apparatus comprising a plurality of cables, includes an elongated cable-retaining body, a plurality of cable holes, a first plurality of cable-receiving slits, a second plurality of cable-receiving slits, a first handle, and a second handle. The plurality of cable holes, which traverse through the elongated cable-retaining body, separate and organize the plurality of cables. Cables are placed into the plurality of cable holes through the first plurality of cable-receiving slits and the second plurality of cable-receiving slits. The user flexes the elongated cable-retaining body with the first handle and the second handle to open the first plurality of cable-receiving slits, and the second plurality of cable-receiving slits to receive or remove cables from the plurality of cable holes.

6 Claims, 7 Drawing Sheets

CABLE ORGANIZER AND PROTECTOR

The current application claims a priority to the U.S. Provisional Patent application Ser. No. 62/272,767 filed on Dec. 30, 2015.

FIELD OF THE INVENTION

The present invention relates generally to cable accessories. More specifically, the present invention is a cable organizer and protector. The cable organizer and protector is specifically designed for electrocardiogram (EKG) machines, however can be utilized on a variety of different devices and apparatuses comprising cables or wires.

BACKGROUND OF THE INVENTION

There are a plurality of devices for the purpose of separating and organizing cables that exist today. However, many such devices are not durable and comprise moving parts which are prone to breaking after a short period of use. Additionally, many the existing cable organizers need to be mounted onto the surfaces of external objects to function properly, therefore does not provide the universal functionality that the present invention provides. In that regard, the cables can easily be pulled away from many of the existing cable organizers, thus does not provide an effective organizing device for transporting wired devices. Therefore, the need for an improved cable organizer is apparent.

The present invention is an improved cable organizer and protector that is specifically designed for electrocardiogram (EKG) machines; however, the present invention can be utilized on any device or apparatus comprising a plurality of cables. The present invention does not comprise any moving parts, thus provides a much more durable device for organizing and separating cables. Further, the cable organizer does not need to be mounted to any external objects. In that regard, the cable organizer is attached to the cables themselves to separate the plurality of cables from one another to provide an organized arrangement. Therefore, the present invention provides an improved cable organizer that is both durable and effective in organizing cables.

DETAIL DESCRIPTIONS OF THE INVENTION

All illustrations of the drawings are for the purpose of describing selected versions of the present invention and are not intended to limit the scope of the present invention.

The present invention is a cable organizer and protector. The present invention that is specifically designed for electrocardiogram (EKG) machines; however, the present invention can be utilized on any device or apparatus comprising a plurality of cables. The present invention allows a user to separate and organize cables or power cords in accordance to convenience or the preference of the user. With regards to a more specific application of the present invention, the cables on EKG machines are easily tangled during storage and transport. EKG machines have a very specific arrangement of cables that must be hooked up to their respective ports. For example, there are cables for the various leads, cables for external monitoring devices, etc. Untangling the cables and wires for setup can be a very time consuming task when EKG monitoring is needed immediately. By utilizing the present invention, the EKG machine cables can be held in a specific arrangement such that they do not become tangled upon storage or transportation.

Figure 1:
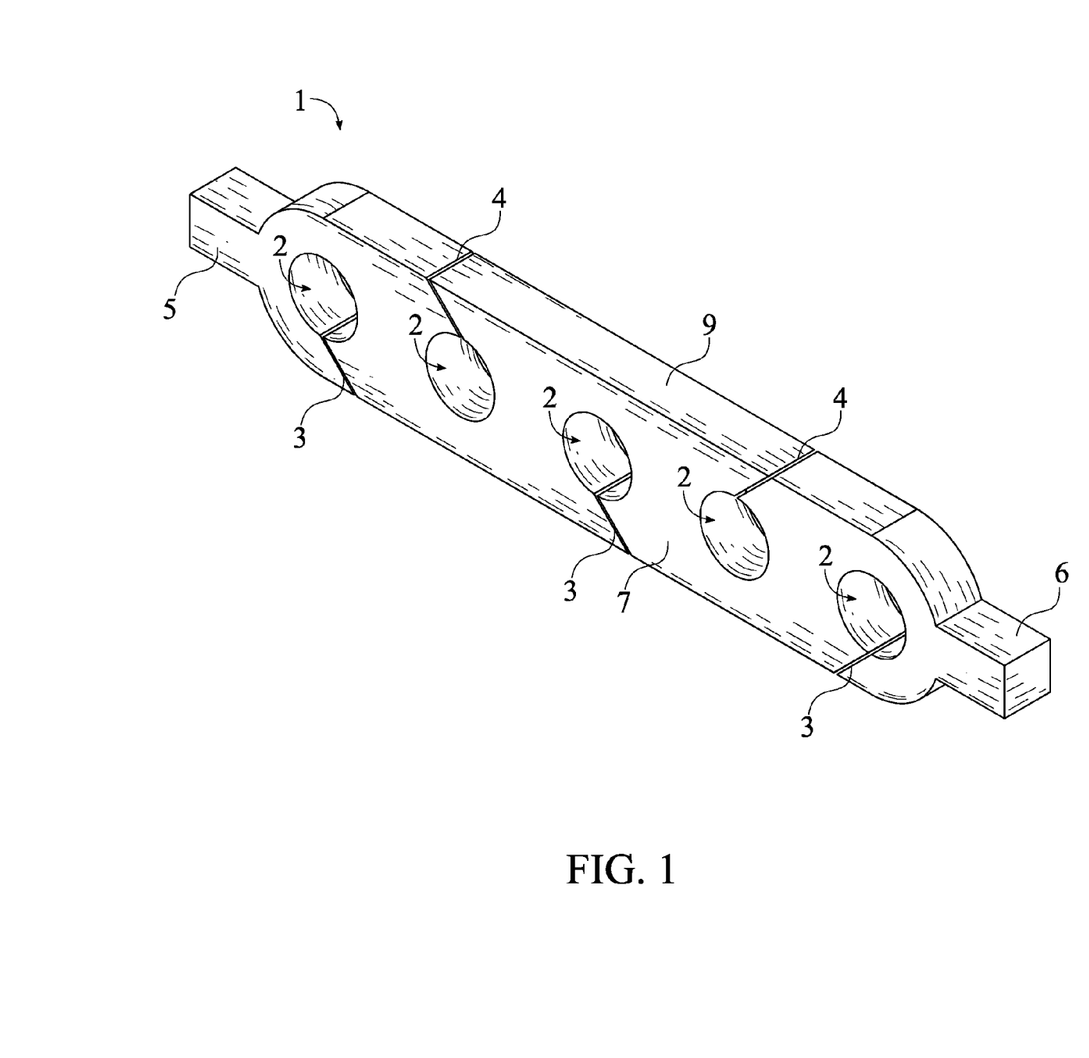
FIG. 1 is a perspective view of the present invention.
Figure 2:
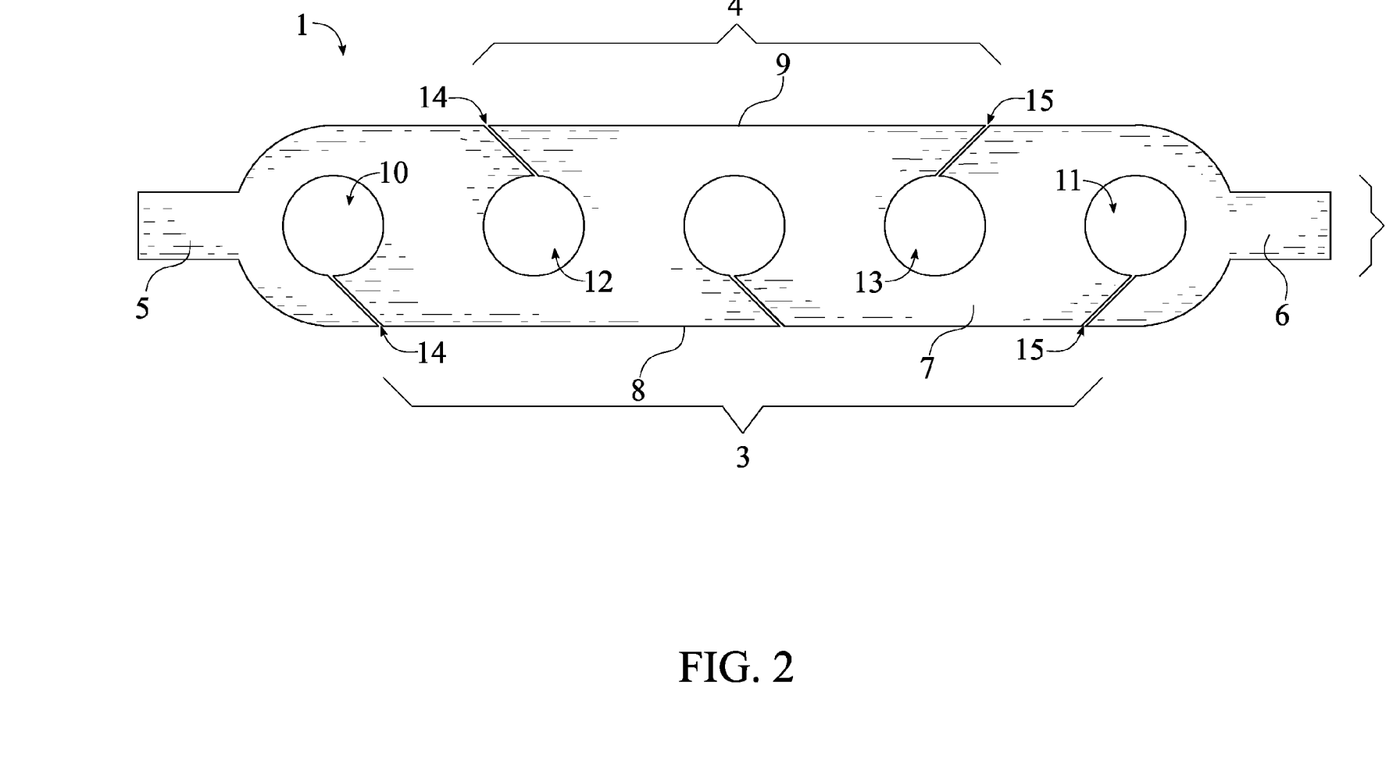
FIG. 2 is a front view of the present invention.
Figure 3:
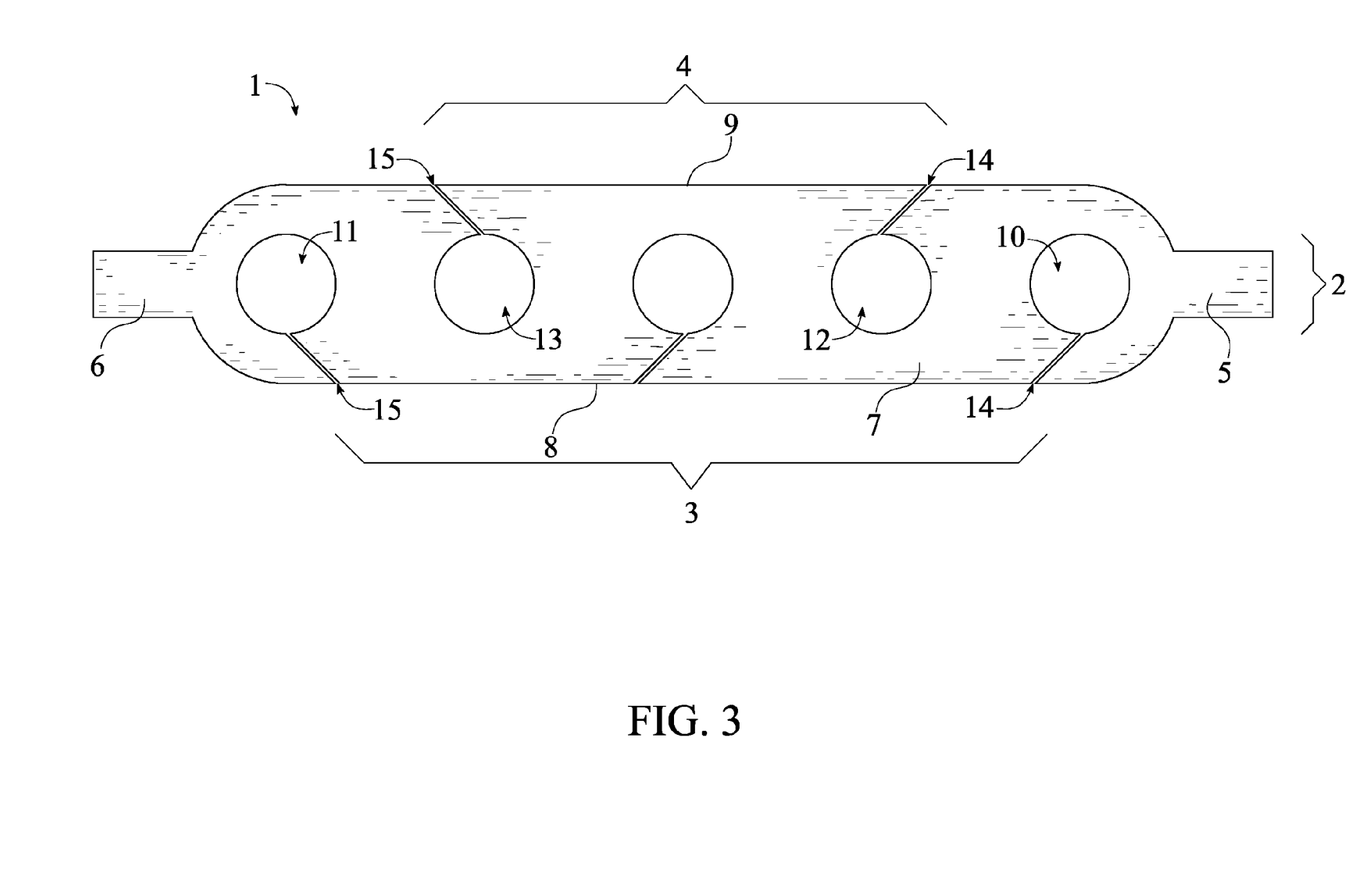
FIG. 3 is a rear view of the present invention.
Figure 4:
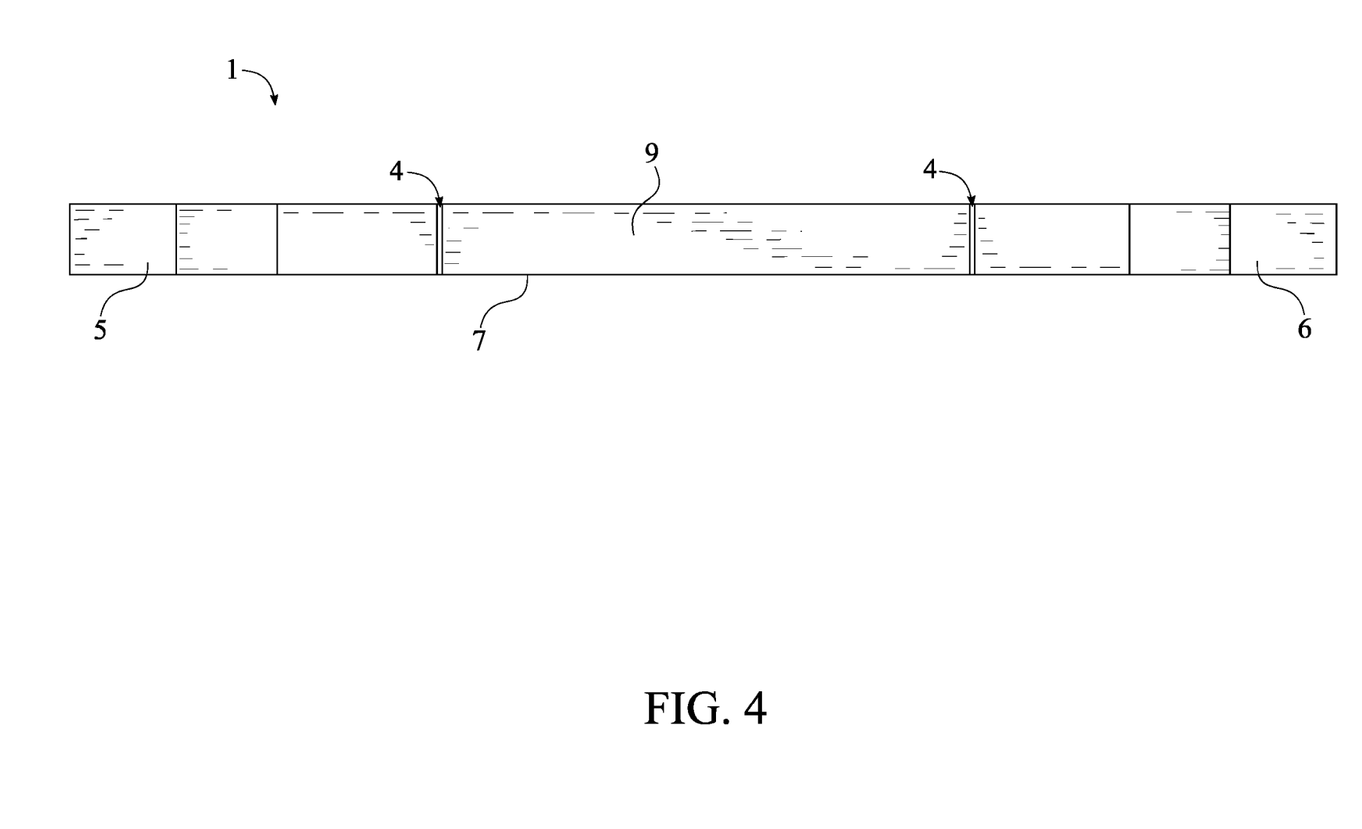
FIG. 4 is a top view of the present invention.
Figure 5:
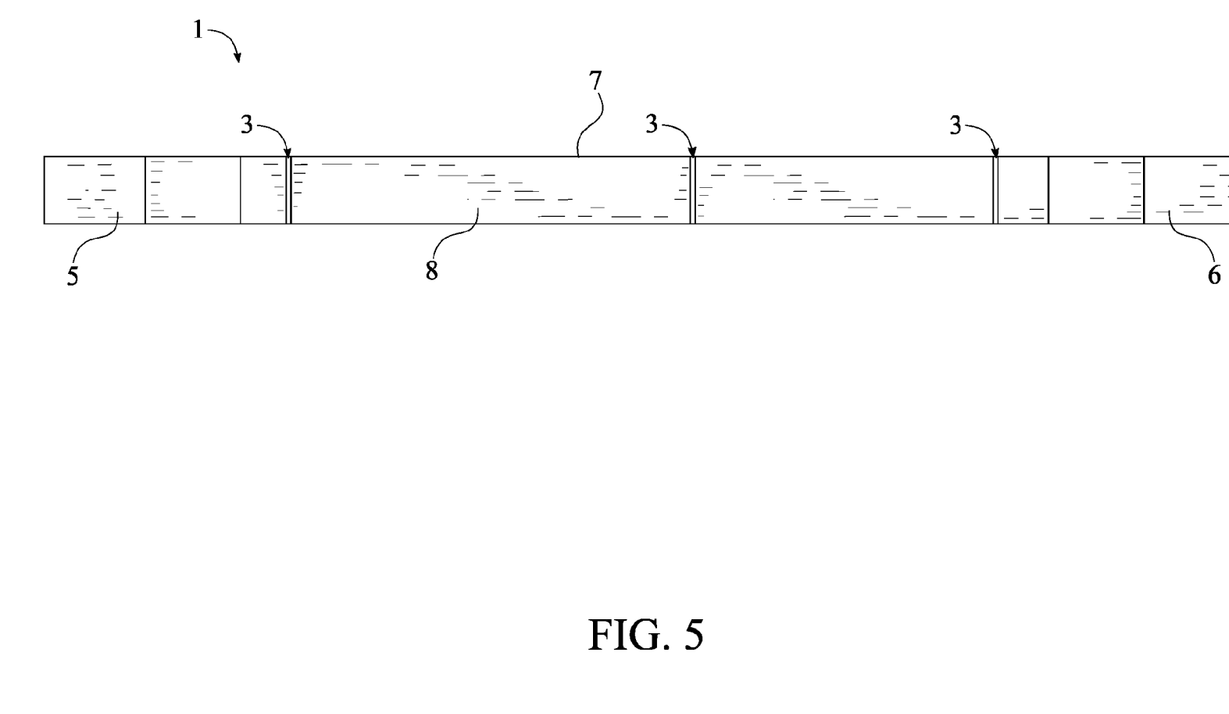
FIG. 5 is a bottom view of the present invention.
Figure 6:
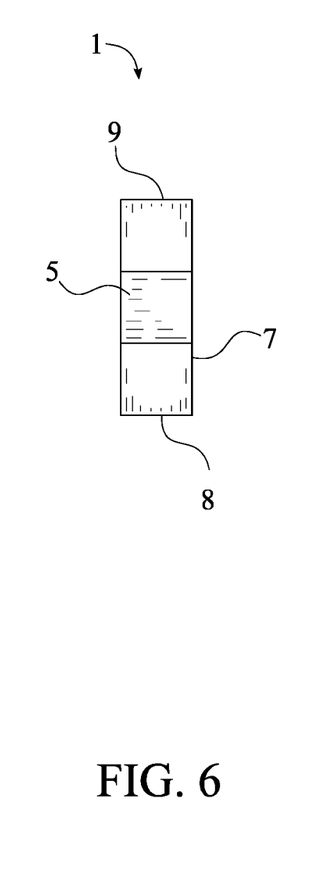
FIG. 6 is a left view of the present invention.
Figure 7:
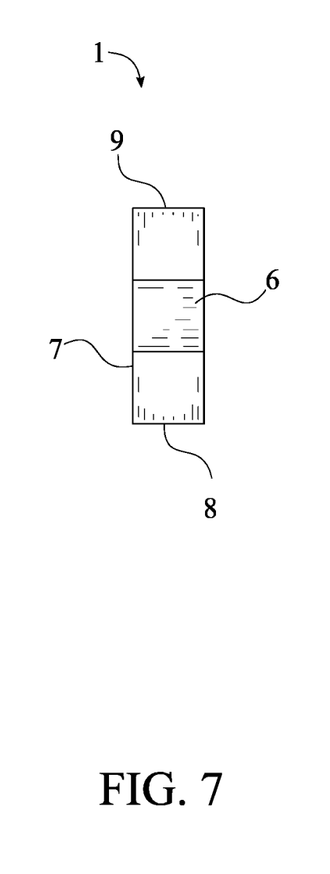
FIG. 7 is a right view of the present invention.

The present invention comprises an elongated cable-retaining body 1, a plurality of cable holes 2, a first plurality of cable-receiving slits 3, a second plurality of cable-receiving slits 4, a first handle 5, and a second handle 6, as shown in FIG. 1 to FIG. 3. The elongated cable-retaining body 1 provides shape and weight to the present invention. The elongated cable-retaining body 1 is constructed from a rigid yet flexible material, for example a hard rubber or dense foam, such that the elongated cable retaining body 1 can be flexed with force by the user, but holds shape when in a static position. The elongated body is preferred to have a coronal cross-section that is an obround shape. The obround shape allows the present invention to have a high cable hole to surface area ratio which allows for sufficient structural support while providing an optimal quantity of cable holes within the plurality of cable holes 2. The elongated cable-retaining body 1 comprises a front face 7, a first lateral face 8, and a second lateral face 9, as shown in FIG. 2 to FIG. 7 for referencing the positioning of other components of the present invention. The first lateral face 8 is positioned opposite to the second lateral face 9 across the elongated cable-retaining body 1. The front face 7 is positioned between the first lateral face 8 and the second lateral face 9. The plurality of cable holes 2 allows cables to be retained within the elongated cable-retaining body 1. The plurality of cable holes 2 traverses through the elongated cable-retaining body 1, normal to the front face 7. The plurality of cable holes 2 is distributed along the elongated cable-retaining body 1, in order to provide a separation space between the cables within each hole of the plurality of cable holes 2. Therefore, the user is able to access each cable during implementation of the present invention.

The first plurality of cable-receiving slits 3 and the second plurality of cable-receiving slits 4 allow for cables to be inserted into or removed from the plurality of cable holes 2. Each of the first plurality of cable-receiving slits 3 traverses from the first lateral face 8 to a corresponding cable hole of the plurality of cable holes 2, as shown in FIG. 2 and FIG. 3. Similarly, each of the second plurality of cable-receiving slits 4 traverses from the second lateral face 9 to a corresponding cable hole of the plurality of cable holes 2. This configuration allows each slit of the first plurality of cable-receiving slits 3 and each slit of the second plurality of cable-receiving slits 4 to open as the user flexes the first handle 5 and the second handle 6 away from either the first lateral face 8 or the second lateral face 9, respectively. The user is then able to insert a cable into or remove a cable from a hole amongst the plurality of cable holes 2.

Further in accordance to the preferred embodiment of the present invention, the first handle 5 and the second handle 6 allow the user to easily flex the elongated cable-retaining body 1, as shown in FIG. 1 to FIG. 5. The first handle 5 and the second handle 6 are preferred to have a coronal cross-section that is a rectangular shape. The rectangular shape of the first handle 5 and the second handle 6 allows the user to easily grip the present invention to flex the elongated cable-retaining body 1 to open either the first plurality of cable-receiving slits 3 or the second plurality of cable-receiving slits 4. The first handle 5 is adjacently and laterally connected to the elongated cable-retaining body 1. Similarly, the second handle 6 is adjacently and laterally connected to the elongated cable-retaining body 1. The first handle 5 is positioned opposite to the second handle 6 along the elongated cable-retaining body 1. The first handle 5 and the second handle 6 are positioned between the first lateral face 8 and the second lateral face 9. Therefore, the user is able flex the present invention by forcing the first handle 5 and the second handle 6 towards or away from either the first lateral face 8 or the second lateral face 9 in order to access the plurality of cable holes 2 through the first plurality of cable-receiving slits 3 or the second plurality of cable-receiving slits 4, respectively.

More specific to the preferred embodiment of the present invention, the first plurality of cable-receiving slits 3 comprises a first terminal slit 14 and a second terminal slit 15, as detailed in FIG. 2 and FIG. 3. The first terminal slit 14 and the second terminal slit 15 are oriented to maximize the opening in order to easily receive a cable. The first terminal slit 14 of the first plurality of cable-receiving slits 3 is positioned adjacent to the first handle 5. The first terminal slit 14 of the first plurality of cable-receiving slits 3 is oriented away from the first handle 5 such that when the first handle 5 and the second handle 6 are flexed away from the first lateral face 8, the first terminal slit 14 efficiently expands to receive or remove a cable from the elongated cable-retaining body 1. The second terminal slit 15 is similarly positioned adjacent to the second handle 6, and the second terminal slit 15 is oriented away from the second handle 6 such that the second terminal slit 15 efficiently expands when the first handle 5 and the second handle 6 are flexed away the first lateral face 8.

In accordance to FIG. 2 and FIG. 3, the plurality of cable holes 2 comprises a first ultimate hole 10 and a second ultimate hole 11. The first ultimate hole 10 and the second ultimate hole 11 are the terminal holes of the distributed plurality of cable holes 2 along the elongated cable-retaining body 1. The first ultimate hole 10 and the second ultimate hole 11 are positioned opposite to each other along the elongated cable-retaining body 1. The first terminal slit 14 of the first plurality of cable-receiving slits 3 traverses from the first lateral face 8 to the first ultimate hole 10. The second terminal slit 15 of the first plurality of cable-receiving slits 3 similarly traverses from the first lateral face 8 to the second ultimate hole 11. This configuration allows the first terminal slit 14 and the second terminal slit 15 of the first plurality of cable-receiving slits 3 to expand in order to allow the user to insert a cable into the first ultimate hole 10 and the second ultimate hole 11, respectively, when the first handle 5 and the second handle 6 are flexed towards the second lateral face 9.

Similarly, the second plurality of cable-receiving slits 4 comprises a first terminal slit 14 and a second terminal slit 15, as shown in FIG. 2 and FIG. 3. Like the first plurality of cable-receiving slits 3, the first terminal slit 14 and the second terminal slit 15 of the second plurality of cable-receiving slits 4 are oriented to maximize the opening in order to easily receive a cable. The first terminal slit 14 of the second plurality of cable-receiving slits 4 is positioned adjacent to the first handle 5. The first terminal slit 14 of the second plurality of cable-receiving slits 4 is oriented towards the first handle 5 such that when the first handle 5 and the second handle 6 are flexed away from the second lateral face 9, the first terminal slit 14 of the second plurality of cable-receiving slits 4 efficiently expands to receive or remove a cable from the elongated cable-receiving body. The second terminal slit 15 of the second plurality of cable-receiving slits 4 is similarly positioned adjacent to the second handle 6, and the second terminal slit 15 of the second plurality of cable-receiving slits 4 is oriented towards the second handle 6 such that the second terminal slit 15 efficiently expands when the first handle 5 and the second handle 6 are flexed away from the second lateral face 9.

In accordance to FIG. 2 and FIG. 3, the plurality of cable holes 2 further comprises a first penultimate hole 12 and a second penultimate hole 13. The first penultimate hole 12 and the second penultimate hole 13 are interior holes of the distributed plurality of cable holes 2 along the elongated cable-retaining body 1. The first penultimate hole 12 is positioned adjacent to the first ultimate hole 10, opposite to first handle 5. The first terminal slit 14 of the second plurality of cable-receiving slits 4 traverses from the second lateral face 9 to the first penultimate hole 12. The second penultimate hole 13 is positioned adjacent to the second ultimate hole 11, opposite to second handle 6. The second terminal slit 15 of the second plurality of cable-receiving slits 4 similarly traverses from the second lateral face 9 to the second penultimate hole 13. This configuration allows the first terminal slit 14 and the second terminal slit 15 of the second plurality of cable-receiving slits 4 to expand in order to allow the user to insert a cable into the first penultimate hole 12 and the second penultimate hole 13 respectively when the first handle 5 and the second handle 6 are flexed towards the first lateral face 8.

Further in accordance to the preferred embodiment of the present invention, the first plurality of cable-receiving slits 3 and the second plurality of cable-receiving slits 4 alternate with each of the plurality of cable holes 2. Each slit of the second plurality of cable-receiving slits 4 is positioned between two adjacent slits of the first plurality of cable-receiving slits 3, as shown in FIG. 2 and FIG. 3. Alternating between the first plurality of cable-receiving slits 3 and the second plurality of cable-receiving slits 4 along the plurality of cable holes 2 prevents cables from inadvertently being dislodged from the present invention when the present invention is flexed by the user to insert or remove other cables during implementation.

Although the invention has been explained in relation to its preferred embodiment, it is to be understood that many other possible modifications and variations can be made without departing from the spirit and scope of the invention as hereinafter claimed.

What is claimed is:
1. A cable organizer and protector comprising:
an elongated cable-retaining body;
a plurality of cable holes;
a first plurality of cable-receiving slits;
a second plurality of cable-receiving slits;
a first handle;
a second handle;
the elongated cable-retaining body comprising a front face, a first lateral face and a second lateral face;
the first lateral face being positioned opposite to the second lateral face across the elongated cable-retaining body;
the plurality of cable holes traversing through the elongated cable-retaining body, normal to the front face;
the plurality of cable holes being distributed along the elongated cable- retaining body;
each of the first plurality of cable-receiving slits traversing from the first lateral face to a corresponding cable hole of the plurality of cable holes;

each of the second plurality of cable-receiving slits traversing from the second lateral face to a corresponding cable hole of the plurality of cable holes;

the first handle being adjacently and laterally connected to the elongated cable-retaining body;

the second handle being adjacently and laterally connected to the elongated cable-retaining body;

the first handle being positioned opposite to the second handle along the elongated cable-retaining body;

each slit of the second plurality of cable-receiving slits being positioned in between two adjacent slits of the first plurality of cable-receiving slits; and a coronal cross-section of the elongated cable-retaining body being an obround shape.

2. The cable organizer and protector, as claimed in claim 1 comprising:

the first plurality of cable-receiving slits comprising a first terminal slit and a second terminal slit;

the first terminal slit being positioned adjacent to the first handle;

the first terminal slit being oriented away from the first handle;

the second terminal slit being positioned adjacent to the second handle; and the second terminal slit being oriented away from the second handle.

3. The cable organizer and protector, as claimed in claim 2 comprising:

the plurality of cable holes comprising a first ultimate hole and a second ultimate hole;

the first ultimate hole and the second ultimate hole being positioned opposite to each other along the elongated cable-retaining body;

the first terminal slit traversing from the first lateral face to the first ultimate hole; and the second terminal slit traversing from the first lateral face to the second ultimate hole.

4. The cable organizer and protector, as claimed in claim 1 comprising:

the second plurality of cable-receiving slits comprising a first terminal slit and a second terminal slit;

the first terminal slit being positioned adjacent to the first handle;

the first terminal slit being oriented towards from the first handle;

the second terminal slit being positioned adjacent to the second handle; and the second terminal slit being oriented towards the second handle.

5. The cable organizer and protector, as claimed in claim 4 comprising:

the plurality of cable holes comprising a first ultimate hole, a second ultimate hole, a first penultimate hole and a second penultimate hole;

the first ultimate hole and the second ultimate hole being positioned opposite to each other along the elongated cable-retaining body;

the first penultimate hole being positioned adjacent to the first ultimate hole, opposite to the first handle;

the second penultimate hole being positioned adjacent to the second ultimate hole, opposite to the second handle;

the first terminal slit traversing from the second lateral face to the first penultimate hole; and the second terminal slit traversing from the second lateral face to the second penultimate hole.

6. The cable organizer and protector, as claimed in claim 1, wherein a coronal cross-section of the first handle and the second handle are a rectangular shape.

* * * * *